(12) United States Patent
Doptis et al.

(10) Patent No.: US 10,603,580 B2
(45) Date of Patent: Mar. 31, 2020

(54) VIDEOGAME PORTAL GAME PLAY

(71) Applicants: Daniel M. Doptis, Troy, NY (US); Brent Gibson, Mechanicville, NY (US)

(72) Inventors: Daniel M. Doptis, Troy, NY (US); Brent Gibson, Mechanicville, NY (US)

(73) Assignee: Activision Publishing, Inc., Santa Monica, CA (US)

( * ) Notice: Subject to any disclaimer, the term of this patent is extended or adjusted under 35 U.S.C. 154(b) by 338 days.

(21) Appl. No.: 15/372,238

(22) Filed: Dec. 7, 2016

(65) Prior Publication Data

US 2017/0165565 A1 Jun. 15, 2017

Related U.S. Application Data

(60) Provisional application No. 62/265,159, filed on Dec. 9, 2015.

(51) Int. Cl.
*A63F 13/235* (2014.01)
*A63F 13/98* (2014.01)
*A63F 13/65* (2014.01)
*A63F 13/69* (2014.01)

(52) U.S. Cl.
CPC ............ *A63F 13/235* (2014.09); *A63F 13/65* (2014.09); *A63F 13/69* (2014.09); *A63F 13/98* (2014.09)

(58) Field of Classification Search
None
See application file for complete search history.

(56) References Cited

U.S. PATENT DOCUMENTS

| | | | |
|---|---|---|---|
| 6,290,565 B1 | 9/2001 | Galyean, III et al. | |
| 6,443,796 B1* | 9/2002 | Shackelford | A63H 33/042 |
| | | | 273/237 |
| 8,864,589 B2 | 10/2014 | Reiche, III | |
| 2009/0197658 A1 | 8/2009 | Polchin | |
| 2010/0032900 A1 | 2/2010 | Wilm | |
| 2014/0179446 A1* | 6/2014 | Zuniga | A63F 9/24 |
| | | | 463/47 |

FOREIGN PATENT DOCUMENTS

WO  WO 2007/101785 A1  9/2007

* cited by examiner

*Primary Examiner* — Robert T Clarke, Jr.
(74) *Attorney, Agent, or Firm* — Klein, O'Neill & Singh, LLP

(57) ABSTRACT

Play of a videogame may be conducted using one or more physical object detection devices as the sole form of game controller(s), or in conjunction with game controllers. Detection of physical objects by the detection devices may be used to determine structures in a virtual world of game play. The detection devices may include radio frequency identification (RFID) readers or voltage or current sensors. The physical objects may include RFID tags or one or more resistors.

14 Claims, 8 Drawing Sheets

VIDEOGAME PORTAL GAME PLAY

CROSS REFERENCE TO RELATED APPLICATION

This application claims the benefit of the filing date of U.S. Provisional Patent Application No. 62/265,159, filed on Dec. 9, 2015, the disclosure of which is incorporated by reference herein.

BACKGROUND OF THE INVENTION

The present invention relates generally to videogames and, more particularly, to videogames that utilize reading devices for obtaining information from physical objects for use in videogame play.

Videogames provide fun and enjoyment for many. Videogames allow game players to participate in a variety of simulated activities. Videogames allow game players to virtually perform roles and experience activities that the game players may not be able or desire to experience directly, whether due to cost, danger, or equipment concerns, or simply due to a role or activity being a fantasy.

Unfortunately, interacting with a virtual game world of a videogame solely through use of a standard videogame controller may lack a degree of physical interaction with real world objects, potentially reducing a game player's level of immersion in the videogame.

BRIEF SUMMARY OF THE INVENTION

Some embodiments in accordance with aspects of the invention provide a videogame system, comprising: a game console including at least one processor; a game controller coupled to the game console, the game controller including a plurality of user input devices; a detection device including a plurality of detection device electrical contacts and circuitry to determine, for at least some of the detection device electrical contacts, an indication of resistances coupled across least some pairs of some of the detection device electrical contacts, and interface circuitry to provide information of the indication of the resistances to the game console; the processor being programmed by program instructions to: identify at least one structure for placement in a virtual world of videogame play based on the indication of resistances, and process inputs from the user input devices of the game controller to determine character actions in the virtual world of videogame play.

Some embodiments in accordance with aspects of the invention provide a method for providing for aspects of videogame play, comprising: reading information from a plurality of physical objects on a detection device, the detection device including at least one radio frequency identification (RFID) reader, at least some of the physical objects including RFID tags; determining a set of structures identified by the information; determining a relative arrangement of structures of the set of structures; placing the structures arranged in the relative arrangement in a predefined area of a virtual world of videogame play; and determining actions of virtual characters in the virtual world.

Some embodiments in accordance with aspects of the invention provide a method for providing for aspects of videogame play, comprising: reading information sequentially over time from a first plurality of physical objects on a first detection device; determining an action of a virtual character in a virtual world of videogame play based on the sequence of information read.

These and other aspects of the invention are more fully comprehended upon review of this disclosure.

BRIEF DESCRIPTION OF THE FIGURES

FIG. 6B illustrates a side view of pin 613 of FIG. 6A extending from the surface 611.

DETAILED DESCRIPTION

Figure 1:
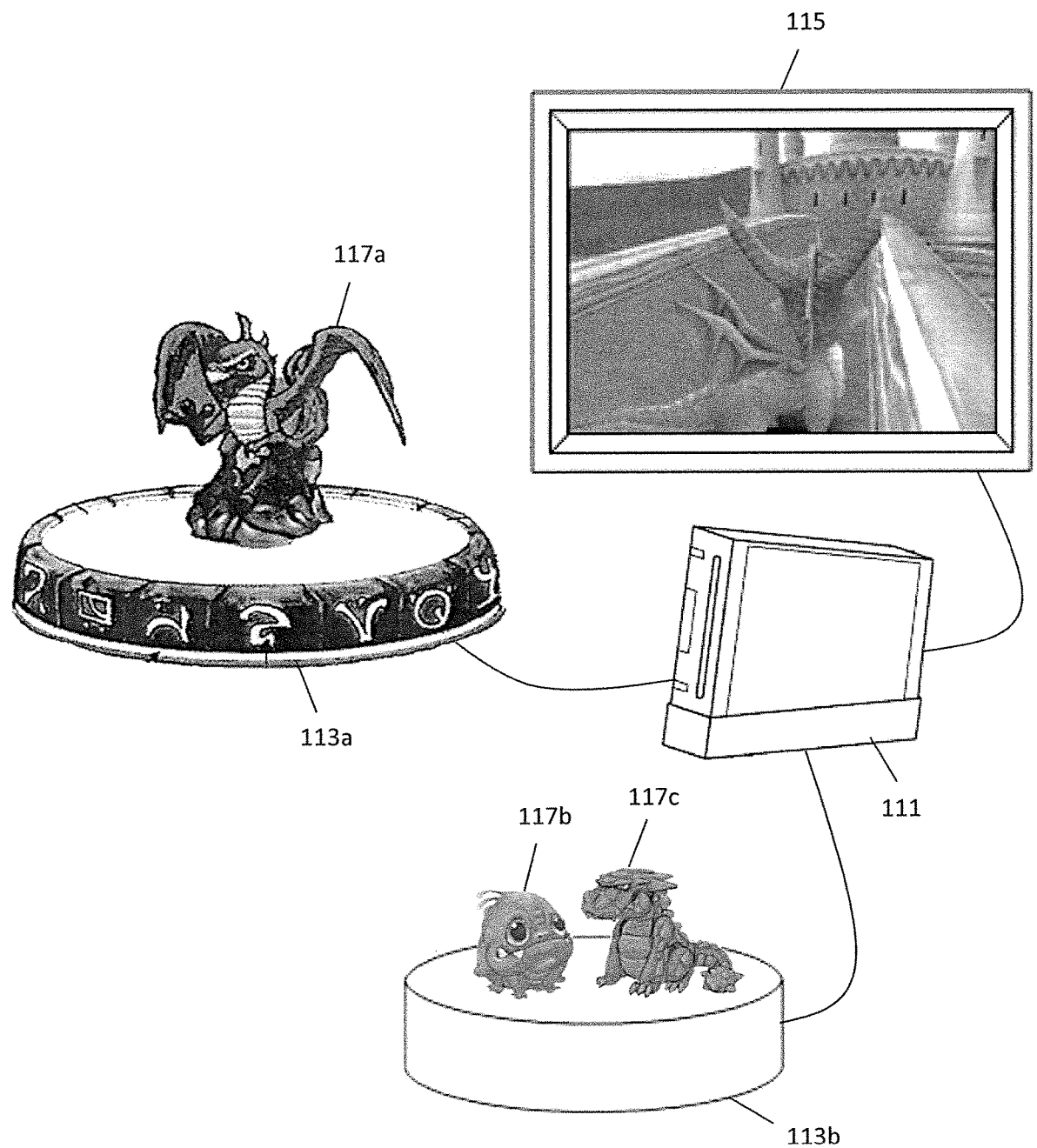
FIG. 1 illustrates an example of a videogame system in accordance with aspects of the invention.

FIG. 1 illustrates an example of a videogame system in accordance with aspects of the invention. The videogame system includes a game console 111 with a processor for executing program instructions providing for gameplay and associated circuitry, a display device 115 for presenting gameplay displays as commanded by the game console, and a plurality of detection devices 113a,b. The detection devices in various embodiments are configured to read information from, and in some embodiments write information to, an object such as a toy, with the detection devices providing the information read to the game console for use in providing for gameplay. In some embodiments, the detection devices may be as illustrated in FIG. 1, which shows a first physical object, in the form of a toy dragon, on a first detection device 113a, and a second and third physical object 117b,c, in the form of fantastical creatures, on a second detection device 113b. In various embodiments the various physical objects include information, for example stored in machine-readable memory, which may be read by the detection devices. In some embodiments, the videogame system may include a plurality of game consoles, each having one or more detection devices. A plurality of game consoles may be configured for multiplayer gameplay and interconnected, for example, by way of the internet or a local area network.

The processor, responsive to inputs from the detection devices, generally provides for gameplay by commanding display on the display device of game characters in and interacting with a virtual world of gameplay and possibly each other. In addition, the processor, responsive to inputs from the detection device, may also add characters and objects to the virtual world, with the characters able to manipulate the added objects and move about the virtual world. For example, the processor may include characters in gameplay based on inputs from the detection devices, and the processor may also control actions of the characters based on inputs from the detection devices.

In some embodiments the processor determines a state of the virtual world during gameplay based on inputs from the detection devices. For example, in some embodiments the state of the virtual world changes as game players, for example each using different detection devices, place (and/or move and/or remove) physical objects on the detection devices, which may then be read by the detection devices. In some embodiments placement, movement, and/or removal of a physical object directly leads to a change in game state, with a new game state dependent solely on a change of detected physical objects and a current game state. In some embodiments the new game state is dependent on a sequence of a plurality of changes of detected physical objects and a current game state, and/or a history of game states. In some embodiments the processor is configured to process changes in inputs from detection devices in a sequential manner, for example ignoring changes in inputs from a second detection device until a change in inputs occurs for a first detection, so as to provide for detection device turn-by-turn game play.

The instructions providing for gameplay may be stored on removable media, for example, an optical disk. Accordingly, the game console may include an optical drive, for example, a DVD-ROM drive, for reading the instructions for gameplay. In some embodiments, instructions providing for gameplay may be downloaded from remote computing device and stored on a storage drive such as a solid-state drive or hard-disk drive. In some embodiments, the game console may be a personal computer, including similar internal circuitry as herein described, as well as, for example, a built-in display and built-in user input devices, such as a keyboard and a touch pad.

The display device is generally coupled to the game console by a cable, although in some embodiments a wireless connection may be used. In many embodiments, the display device is a liquid crystal display. In some embodiments, the display device is a television. A display screen of the display device displays video images of game play, generally as commanded by the processor or other associated circuitry of the game console. In the embodiment of FIG. 1, the display screen shows a screenshot of videogame play. As illustrated, the screenshot shows a display of a character, generally controlled by and animated in accordance with user inputs, approaching an inanimate item in the form of what may be considered a castle.

The detection devices, in some embodiments and as shown in FIG. 1, have a substantially flat upper surface for placement of toys thereon. Each toy includes a machine-readable identifier, for example, a radio-frequency identification (RFID) tag, a bar code, or other identifier. The machine-readable identifier may be sensed, read, and/or written by the detection device. The machine-readable identifier may include a numeric identifier. The machine-readable identifier allows the detection device, or the processor of the game console, to distinguish one toy from other toys, and the machine-readable identifier may therefore be considered to include a toy identifier. Each particular toy generally has its own distinct identifier. In some embodiments, the detection device has a plurality of substantially flat upper surfaces for placement of toys thereon, each capable of sensing, reading, and/or writing a toy's machine-readable identifier.

The game player generally places physical objects, for example toys, in the form and representative of a dragon and fantasy figures as shown in FIG. 1, on the flat surface of one of the detection devices during game play. The toys are generally in the form of and representative of game items such as game characters, vehicles, weapons, locations, buildings, or other game items. In some embodiments the toys may be, or include features, as discussed in U.S. patent application Ser. No. 13/335,737, filed Dec. 22, 2011, entitled "Interactive Video game With Visual Lighting Effects" and/or U.S. patent application Ser. No. 13/359,361, filed Jan. 26, 2012, entitled "Interactive Video game With Toys Having Special Effects," the disclosures of both of which are incorporated herein by reference for all purposes.

Each toy includes machine-readable information, for example, memory, a radio-frequency identification (RFID) tag, or a barcode. In some embodiments, the machine-readable information may be encoded in the physical features of the toy itself or embedded on the surface of the toy. As discussed, the machine-readable information may be sensed, read, and/or in some embodiments written, by the detection device, in some embodiments indirectly by way of sending data and commands to the toy to write the data to memory of the toy. The machine-readable information may include a numeric identifier. The machine-readable information allows the detection device, or the processor of the game console, to distinguish one toy from other toys, and the machine-readable information may therefore be considered to include a toy identifier, and in some embodiments, each particular toy has its own distinct identifier. In addition, in many embodiments the machine-readable information includes additional information about a corresponding game character or item, including in some embodiments, the status of the game character or item in a game.

When a toy is read by one of the detection devices, the detection device provides the game console an indication of the identifier and status information of the toy, and generally the processor of the game console changes game state status of the virtual world of game play.

Figure 2:
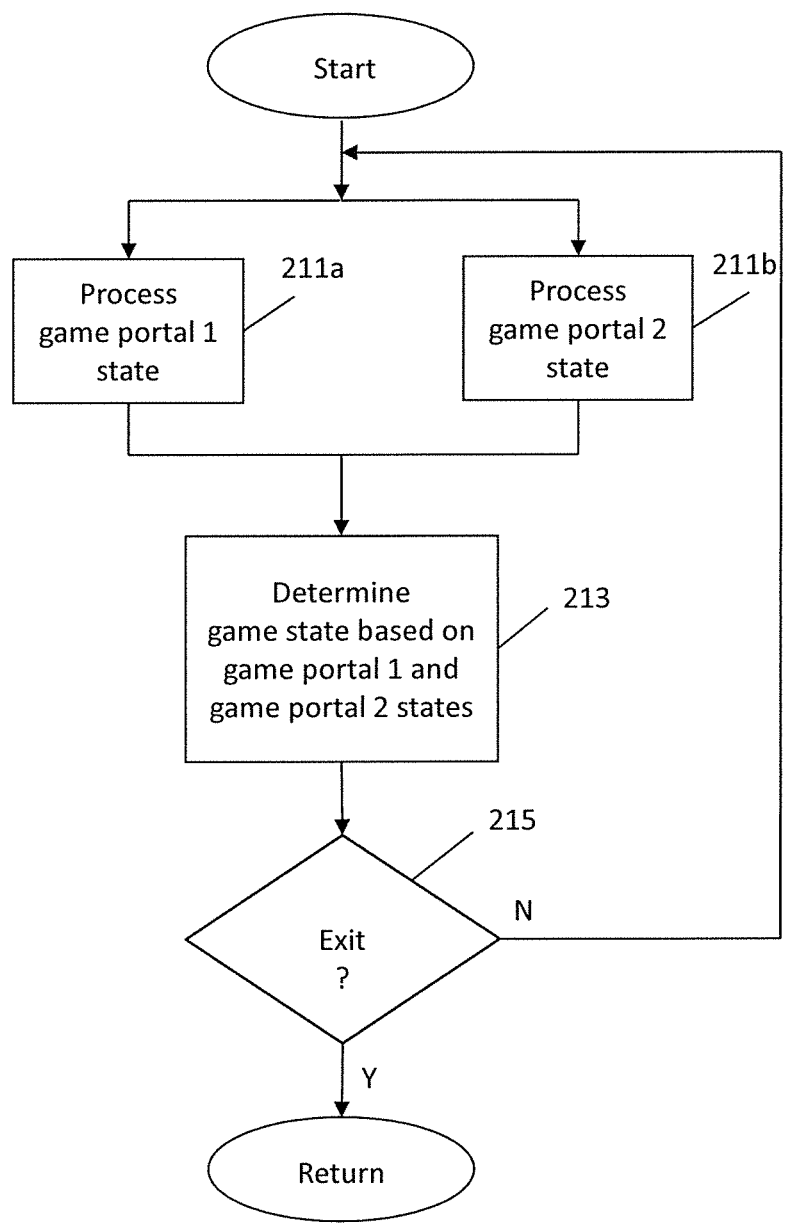
FIG. 2 is a flowchart of a process for providing gameplay using detection devices in accordance with aspects of the invention.

FIG. 2 is a flowchart of a process for providing gameplay using detection devices in accordance with aspects of the invention. In some embodiments the process is performed by a game device, for example the game console 111 of FIG. 1. In some embodiments the process may be performed by a processor configured by program instructions, for example the processor of the game console.

In block 211a, the process processes a state of a first detection device, which in some embodiments may be a game portal. The state of the first detection device may be controlled by a game player operating one or more physical objects, e.g., a toy, with the physical object(s) being placed on and/or removed from the first detection device. In some embodiments the state of the first detection device is indicative of a change in inputs from the first detection device. The change in inputs for example may be from detection of presence of a physical object on the first detection device to a lack of such, or vice versa. In some embodiments the change in inputs may occur when the physical object is moved from one position or region on the first detection device to another. The process then continues to block 213.

In parallel with or sequential to the operations of block 211a, in block 211b the process processes a state of a second detection device, which in some embodiments may also be a game portal. As with the state of the first detection device, the state of the second detection device may also be controlled by a game player operating one or more physical objects, with the physical object(s) being placed on and/or removed from the second detection device. In some embodiments the state of the second detection device is indicative of a change in inputs from the second detection device. The change in inputs for example may be from detection of presence of a physical object on the second detection device to a lack of such, or vice versa. In some embodiments the change in inputs may occur when the physical object is moved from one position or region on the second detection device to another. The process then continues to block 213.

In block 213, the process determines a game state of a virtual world during gameplay based on states of the first and second detection devices. For example, in some embodiments the game state of the virtual world changes as game players, for example one using the first detection device and another using the second detection device, place (and/or remove) physical objects on the first and second detection devices. In some embodiments placement and/or removal of a physical object leads to a change in the game state, with a new game state being dependent on the state of the first detection device and a current game state. Additionally or alternatively, in some embodiments the new game state is dependent on the state of the second detection device and the current game state. In some embodiments the new game state is dependent on a sequence of a plurality of states of the first and/or second detection devices and the current game state, and/or a history of game states. In some embodiments the new game state is only dependent on the state of the detection devices, and/or their prior states. The process then proceeds to block 215.

In block 215, the process determines whether to exit. In some embodiments the process exits upon receipt of an interrupt signal. In other embodiments the process may exit if there is no physical object placed or detected on the first and second detection devices for a predetermined time period. In some embodiments, the process may exit if, after a predetermined time period, the states of the first and second detection devices indicate there is no change in inputs from the first and second detection devices. If the process determines not to exit, the process continues to blocks 211a and 211b. Otherwise, the process returns.

Figure 3:
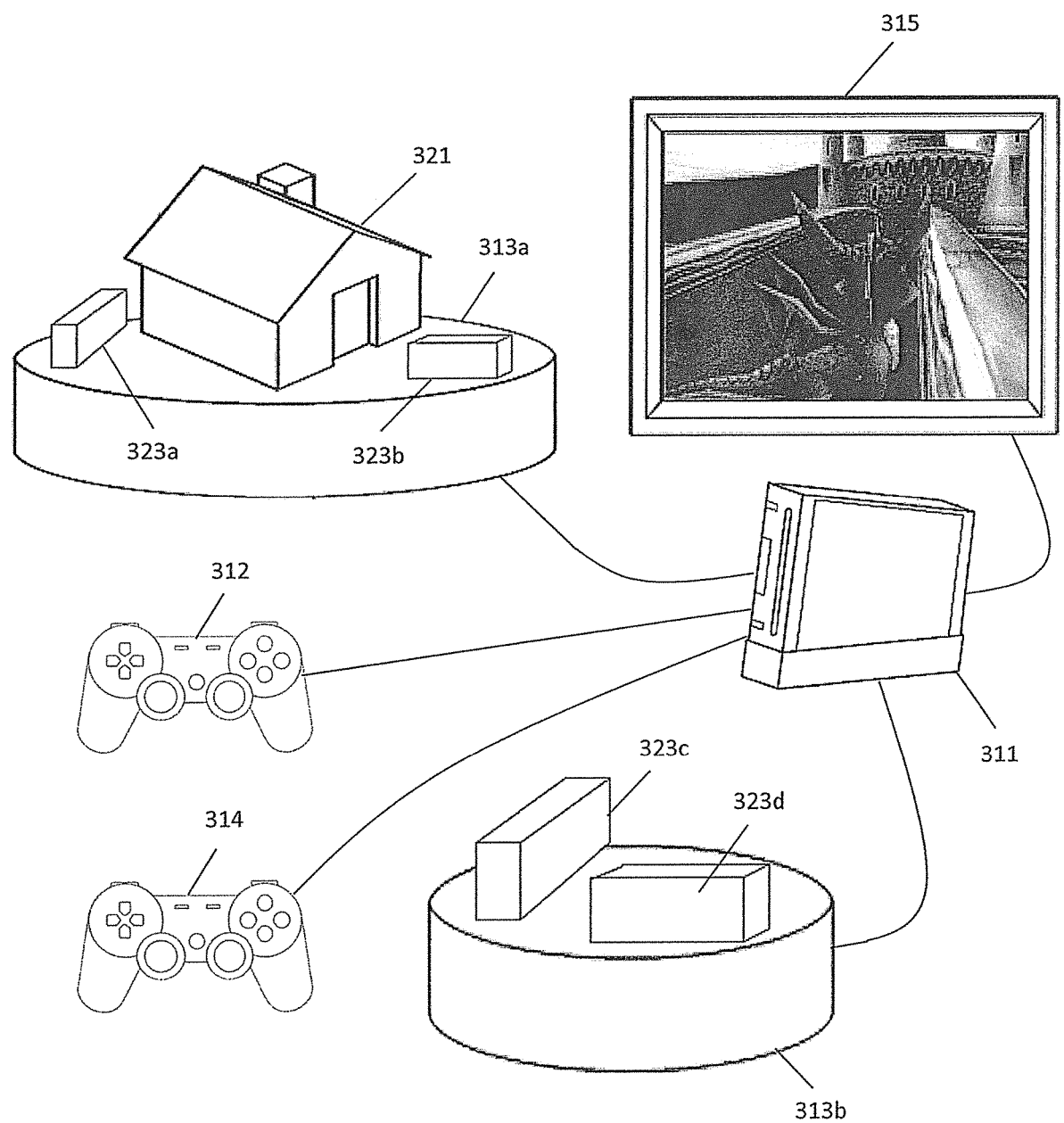
FIG. 3 illustrates a further example of a videogame system in accordance with aspects of the invention.

FIG. 3 illustrates a further example of a videogame system in accordance with aspects of the invention. The videogame system of FIG. 3 includes a game console 311 with a processor for executing program instructions providing for gameplay and associated circuitry, a display device 315 for presenting gameplay displays as commanded by the game console, a first game controller 312 and a second game controller 314 for providing user inputs, and a plurality of detection devices, shown as a first detection device 313a and a second detection device 313b. The detection devices in various embodiments are configured to read information from, and in some embodiments write information to, an object such as a toy, with the detection devices providing the information read to the game console for use in providing for gameplay. In some embodiments the detection devices 313a,b are the same as the detection devices 113a,b of the system of FIG. 1. In some embodiments, the videogame system may include a plurality of game consoles, each having one or more detection devices. A plurality of game consoles may be configured for multiplayer gameplay and interconnected, for example, by way of the internet or a local area network.

For the example of FIG. 3, three physical objects are on the first detection device 313a, a first physical object 321 in the form of a house, a second physical object 323a in the form of a wall, and a third physical object 323b, also in the form of a wall. Similarly, two physical objects are on the second detection device 313b, a fourth physical object 323c and a fifth physical object 323d, both in the form of a wall. Each of the physical objects includes machine readable information, readable by the detection devices. In some embodiments the machine readable information is as discussed with respect to the toys of FIG. 1, and the physical objects may include, for example, memory, an RFID tag, or a barcode. In some embodiments one of the detection devices may be used for physical objects in the form of structures, and another of the detection devices may be used for physical objects in the form of toy characters.

In some embodiments the detection devices read information from, or detect, physical objects within a readable range of the detection devices. In various embodiments the physical objects are within the readable range of the detection devices when the physical objects are on the detection devices. The information, or some of the information, read from the detected physical objects is provided by the detection devices to the game console. In various embodiments the game console may also differentiate between information provided by different ones of the detection devices, for example by receiving signals from the detection devices on different inputs and/or by receiving identifiers of the detection devices along with the information regarding the detected physical objects.

In some embodiments information from each of the physical objects identifies a particular structure, and each physical object may resemble such a structure. For example, in FIG. 3, the first physical object 321 is in the form of a house, and the information stored in or by the first physical object may identify a structure in the form of a house. Similarly, the second physical object 323a, the third physical object 323b, the fourth physical object 323c, and the fifth physical object 323d are all in the form of a wall, and each may store information identifying them as a wall. In various embodiments, the information stored in the second, third, fourth, and fifth physical objects may be different, for example uniquely identifying each physical object, and the different information may indicate walls having the same or different virtual characteristics.

The game console uses the information of the physical objects from the detection device to determine a structure or set of structures for particular areas of a virtual game world. In some embodiments information of the physical objects from a particular detection device is used by the game console to determine structures for a corresponding particular area of the virtual game world. In various embodiments, each detection device may be associated with a particular game player, and the corresponding particular area may be considered a base in the virtual game world for that game player.

Figure 4:
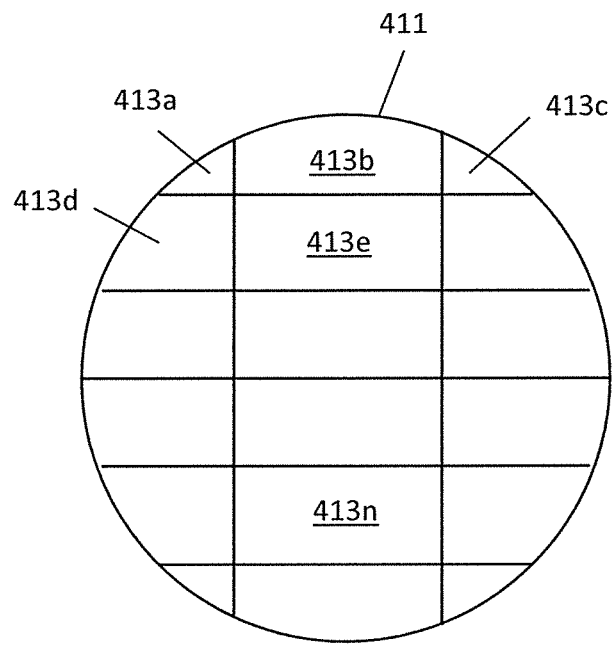
FIG. 4 illustrates schematically a top view of a detection device 411 with multiple reading zones.

In some embodiments the game console populates each particular area of the virtual game world with structures identified by physical objects read from a corresponding detection device. In some embodiments the game determines positions of the structures in each particular area in a predefined manner. For example, if a detection device, such as detection device 313a, provides a game console with information identifying a house and two walls, the game console may place a house and two walls in a predefined relationship to each other in the particular area of the virtual game world. In other embodiments the game console may place the house and two walls in one of several predefined relationships to each other, with a particular one of the predefined relationships possibly selected in a random or pseudo-random manner, or selected by a game player. In some embodiments the detection device, in addition to simply detecting physical objects, may also detect position or relative position information of the physical objects. For example, FIG. 4 illustrates schematically a top view of a detection device 411 in accordance with aspects of the invention with multiple zones 413a-n. In some embodiments the multiple zones are RFID reading zones, while in some embodiments the multiple zones are capacitive touch sensor zones. For example, in embodiments in which the zones are RFID reading zones, the RFID reading zones may include a plurality of reading zones 413a-d in different areas about a periphery of a top surface of the detection device, and further reading zones, for example reading zones 413e and 413n, about other locations of the detection device. In such embodiments different RFID readers of the detection device may be associated with each reading zone, or a single RFID reader or circuitry associated with the RFID reader may be configured to distinguish between signals from the different zones, for example using time-multiplexing of signals to and from the different zones. In some embodiments the multiple zones 413a-n of the detection device 411 are touch sensor zones, for example separate capacitive touch sensor zones. In some embodiments, a single capacitive touch sensor area with multiple capacitive touch sensors is generally provided across the top of the detection device, as may be found in a capacitive touchscreen device, for example. In such embodiments the physical objects may include a conductive surface, or may be for example of or include a conductive material, for example a conductive plastic or a polymeric matrix including conductive materials. The capacitive touch sensor(s) of the detection device may therefore effectively provide information as to location of the physical object while the physical object is being touched by a game player. In some embodiments with touch sensor zones or area(s), the detection device additionally includes one or more RFID readers, with the physical objects including RFID tags having information identifying the physical objects, and in some embodiments including information regarding characteristics of the physical objects. In both the embodiments with multiple RFID reading zones and the embodiments with touch sensor zones or areas, the detection device receives information as to location and/or relative position of the physical objects. In such embodiments the game console may use the position or relative position information in populating and placing structures in the particular area of the virtual game world.

In some embodiments, the detection device comprises a plurality of detection areas, one or more of which may be configured to detect physical objects of a certain type. For example, the detection device may comprise two detection areas, one for the placement of defensive objects and the other for placement of offensive weapons. In another example, the detection device may comprise a central detection area for placement of building objects, the central detection area being surrounded by a plurality of peripheral detection areas for placement of wall objects or weapon objects. Of course, in various embodiments any other configuration may be used.

For the system of FIG. 3, therefore, with the physical objects as arranged on the first and second detection devices, the game console may populate a first particular area of the virtual game world with a house and two walls and populate a second particular area of the virtual game world with two walls. The first particular area may be a base for a first game player and the second particular area may be a base for a second game player. During game play, the first game player may control a first virtual game character within the virtual game world using the first game controller, with the game console determining first virtual game character actions based on inputs from the first game controller. Similarly, the second game player may control a second virtual game character within the virtual game world using the second game controller, with the game console determining second virtual game character actions based on inputs from the second game controller. In some such embodiments, the first and second virtual game characters may interact with each other and/or engage in activities in their own or the other player's base. In addition, in some embodiments, identities and/or characteristics of the first virtual game character and/or the second virtual game character may be based on physical objects read by the detection devices, with the physical objects for example representative of and storing information of a virtual game character.

Figure 5:
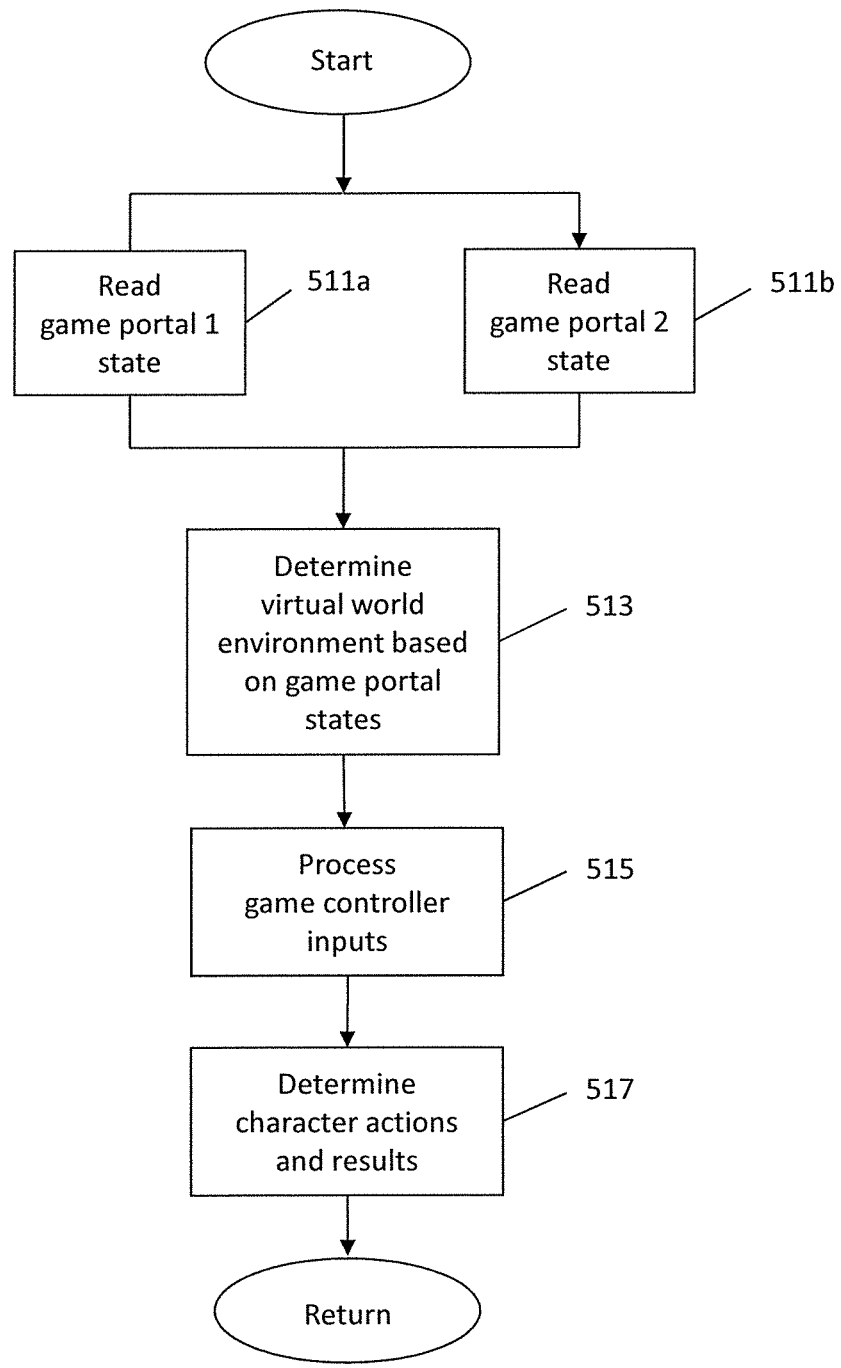
FIG. 5 is a flowchart of a process for providing gameplay with game world structures based on detected physical objects in accordance with aspects of the invention.

FIG. 5 is a flowchart of a process for providing gameplay with game world structures based on detected physical objects in accordance with aspects of the invention. In some embodiments the process is performed by a game device, for example the game console of FIG. 3. In some embodiments the process is performed by a processor configured by program instructions, for example the processor of the game console.

In blocks 511a and 511b the process reads information provided by a first detection device and a second detection device, respectively. The detection devices may be as discussed with respect to FIG. 1, 3, or 4, or as otherwise discussed herein. The detection devices generally read information from physical object placed on the detection devices, with the information relating to a structure for use in game play. As the detection devices provide information from physical objects for use in game play, the detection devices may be considered game portals for the physical objects. In some embodiments the process may read the information from the detection devices sequentially, although FIG. 5 shows the operations of blocks 511a and 511b as occurring in parallel. In addition, although use of two detection devices is shown in the process of FIG. 5, in various embodiments only one detection device may be used, and in other various embodiments use of more than two detection devices may be supported, either locally or networked.

In block 513 the process determines aspects of a virtual game world environment based on the information provided by the detection devices. In some embodiments the process determines structures to place in one or more predefined areas of the virtual game world environment based on the information provided by the detection devices. In some embodiments the information provided by the detection devices identifies the structures. In some embodiments the information provided by the detection devices identifies the structures and their characteristics, for example, shape, size, color, texture, and other features of the structures. In some embodiments the information provided by the detection devices identifies the structures, with the game console separately storing or accessing stored information regarding characteristics of the structures. In some embodiments the information provided by the detection devices identify the structures and, on a per detection device basis, their relative positions to one another and/or orientation to one another and/or with respect to the detection device.

In some embodiments each of the predefined areas of the virtual game world environment may be considered a base for a virtual game character associated with a one of the detection devices. In some embodiments each virtual game character is also associated with a different game player, with the game console determining actions of each virtual game character based on inputs from controllers operated by different game players. Accordingly, in some embodiments each of the bases may be associated with a one of the game players.

In block 515 the process processes inputs from the game controllers. In some embodiments the process processes the inputs to determine a game controller from which the inputs originate and/or formats the inputs for game processing.

In block 517 the process determines character actions of virtual game characters within the virtual game world environment and results of such actions. In various embodiments the actions of the virtual game characters include movements or other actions about or around the structures placed in the virtual game world environment.

The process thereafter returns.

Figure 6A:
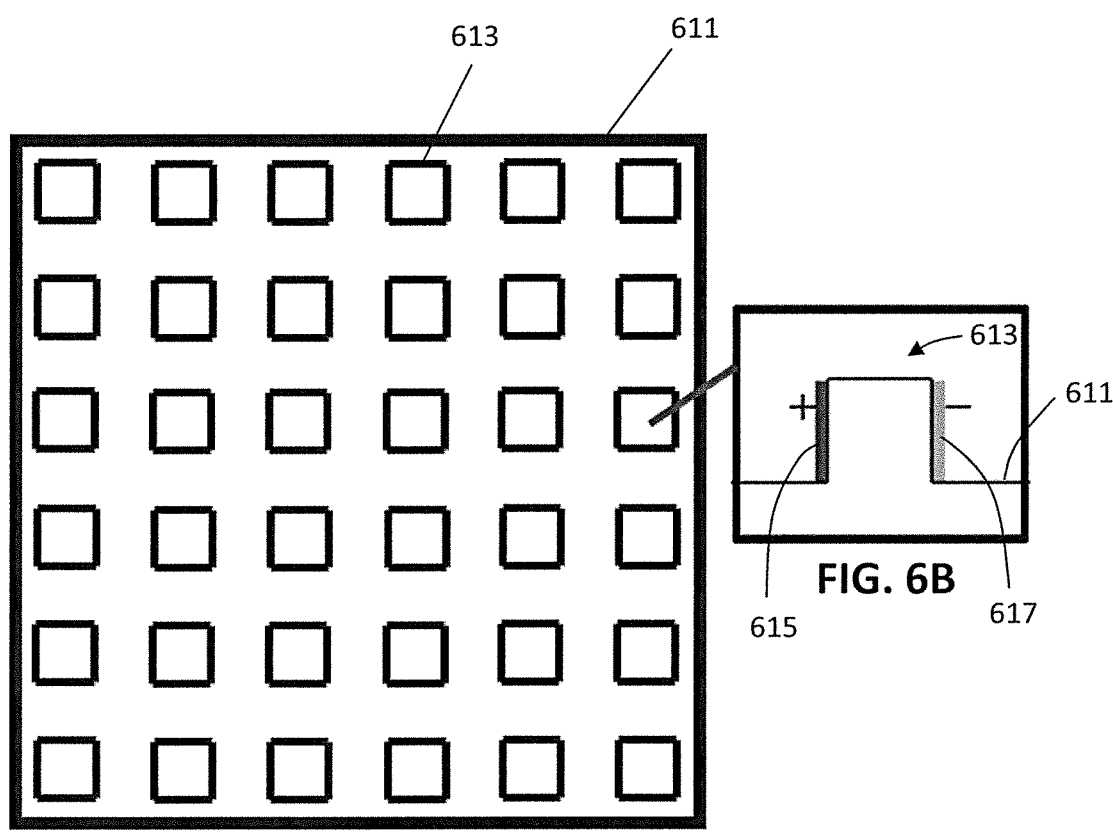
FIG. 6A is a top plan view of a further embodiment of a detection device in accordance with aspects of the invention.

FIG. 6A is a top plan view of a further embodiment of a detection device in accordance with aspects of the invention. The detection device includes a substantially flat surface 611 with protruding pins, for example pin 613. In FIG. 6A the pins are illustrated as arranged in columns and rows in a regular manner, although in various embodiments the pins may be otherwise arranged. Similarly, in FIG. 6A the pins are shown as having a substantially square cross-section, in various embodiments the pins may have other cross-sectional forms. In some embodiments the detection device of FIG. 6A is used in place of one or both of the detection devices of FIG. 3. In some embodiments the detection device of FIG. 6A is used in place of one of the detection devices of FIG. 3, one used for physical objects in the form of structures, while another detection device, for example a detection device with an RFID reader, is used for physical objects in the form of toy characters.

FIG. 6B illustrates a side view of pin 613 of FIG. 6A extending from the surface 611. The pin includes a first electrical contact 615 on a first side of the pin and a second electrical contact 617 on a second side of the pin opposite the first side. For convenience, the first electrical contact may be considered a positive contact and the second electrical contact may be considered a negative contact. In general, each of the pins includes positive and negative contacts as shown for the pin 613.

The positive contacts and the negative contacts are electrically connected to circuit elements (not shown) in the detection device. In some embodiments each positive contact and negative contact for a pin is coupled to circuitry that may detect differences in voltage between the two contacts. A signal indicative of the differences in voltage between the two contacts may be provided, for example, to a game console. In various embodiments an identification of the two contacts, or a single one of the two contacts, is also provided to the game console. The game console may use the identification of the contact(s) to determine positions of structures within a virtual game world, for example.

For example, in some embodiments each contact of a pin may be coupled to an analog comparator, with an output of the comparator provided to an analog-to-digital converter (ADC), although in some embodiments the ADC may include both comparison and conversion functions. The ADC provides a digital signal indicative of differences between the two contacts, and the digital signal may be provided to, for example, a game console. In some embodiments only one of the two contacts may be coupled to the comparator, with the other coupled to a power source of a known voltage or ground, with the known voltage or ground also provided to the comparator. For example, in some embodiments one of the two contacts may be coupled to a power source and the other contact of the two contacts may be coupled to ground by way of a resistance, which may be in the form of a resistor, with voltage measured between the contact and the resistor. Whether both contacts are coupled to the comparator, or only one of the contacts while the other is connected to a known voltage, the contacts may be considered as effectively coupled to the comparator. In some embodiments the pairs of contacts may be sequentially effectively coupled to the comparator, for example in a time multiplexed approach. In some embodiments the pairs of contacts may be effectively coupled to comparators, with outputs of the comparators sequentially coupled to the ADC, for example in a time multiplexed approach. In some embodiments there may be a single ADC for each column of pins, in some embodiments there may be a single ADC for each row of pins, and in some embodiments there may be a single ADC for an entire detection device.

Figure 7A:
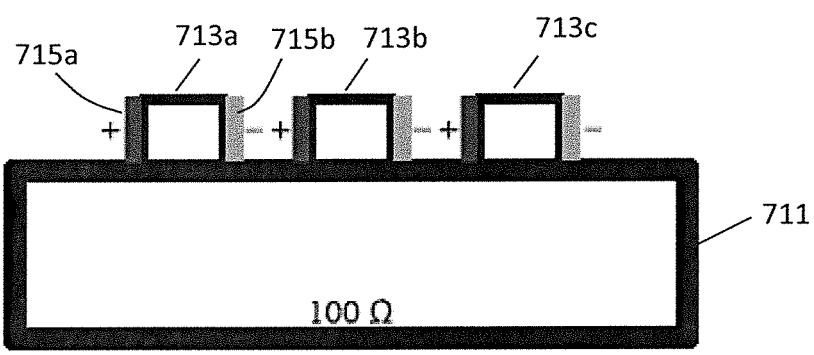
FIG. 7A shows a front view of an example physical object that may be used with the detection device of FIG. 6A.
Figure 7B:
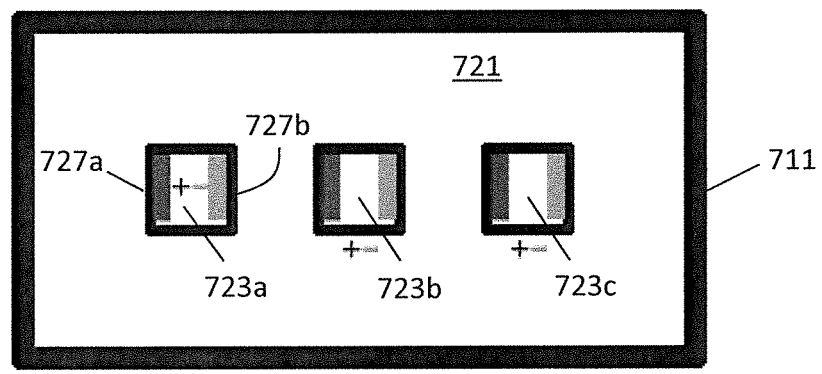
FIG. 7B shows a bottom view of the physical object of FIG. 7A.

FIG. 7A shows a front view of an example physical object that may be used with the detection device of FIG. 6A, and FIG. 7B shows a bottom view of the physical object of FIG. 7A. The physical object is generally in the form of a block 711, with a bottom surface 721 of the block having cavities 723a-c and protruding pins 713a-c extending from a top surface of the block. Although the block is shown with three cavities and three pins, both arranged linearly, in various embodiments blocks may have fewer or greater numbers of cavities and pins. The cavities are dimensioned to receive protruding pins of a detection device, for example the detection device of FIG. 6A. The cavities are also positioned relative to one another, for blocks having multiple cavities such as the block of FIG. 7A, with the same spacing as that of the protruding pins of the detection device. The protruding pins 713a-c of the block are also dimensioned to be the same as or similar to protruding pins of the detection device, and similarly spaced. Accordingly, the cavities may also receive protruding pins of other blocks, and the blocks may be stacked on top of each other in various arrangements.

Each of the cavities of the block include a pair of contacts, for example contacts 727a,b for the cavity 723a, like the protruding pins of the detection device. Also like the contacts for the protruding pins of the detection device, each pair of contacts for the cavities may be considered for convenience to include a positive contact and a negative contact. Similarly, the protruding pins of the block also include a pair of contacts, for example contacts 715a,b for pin 713a.

In some embodiments corresponding positive contacts of a cavity/pin pair are electrically coupled, as are corresponding negative contacts of the cavity/pin pair. In some embodiments a resistance, for example in the form of a resistor, bridges lines between positive contacts and negative contacts. For example, for the block of FIG. 7A a 100 Ohm resistor may be electrically coupled between the positive contacts and negative contacts of a cavity/pin pair. In other embodiments the 100 Ohm resistor may instead be coupled between a positive contact of a first cavity and a negative contact of a second cavity. The cavities may be, for example, cavities at opposing ends of the block.

Figure 8:
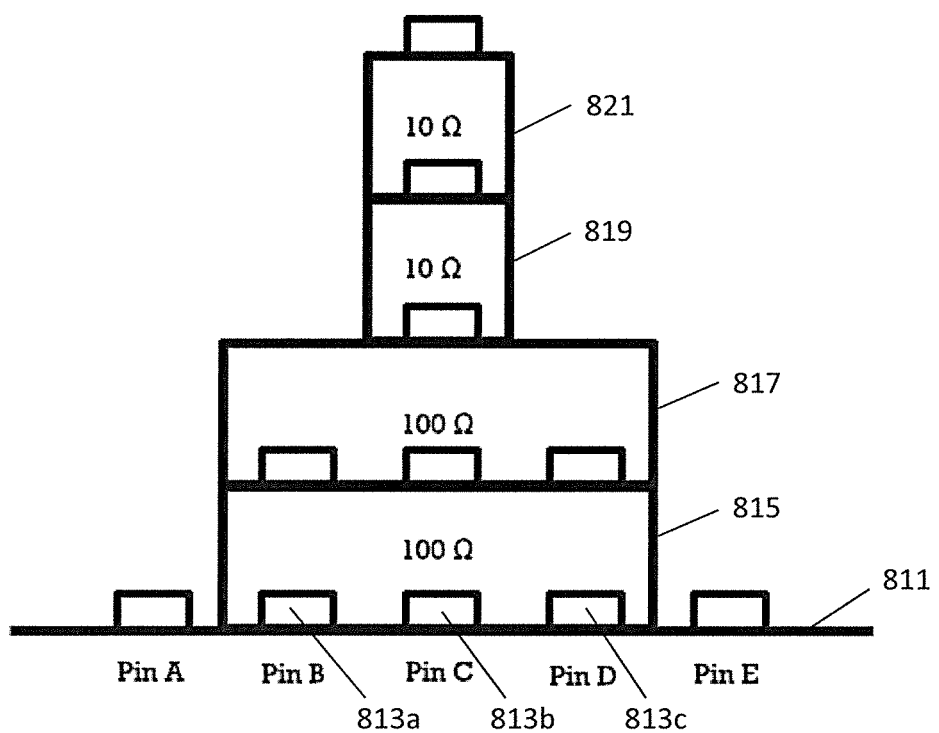
FIG. 8 illustrates an arrangement of blocks on a portion of a detection device.

FIG. 8 illustrates an arrangement of blocks on a portion of a detection device. The detection device is some embodiments is the same as or, in some embodiments, similar to the detection device of FIG. 6A. A surface 811 of the detection device includes a plurality of protruding pins, including linearly arranged pins 813a-c. A first block 815 is set over the linearly arranged pins 813a-c of the detection device. The first block may be, for example, the block as discussed with respect to FIG. 7A. As such, the first block includes linearly arranged cavities on its underside to receive the pins of the detection device, and protruding pins on its top. Contacts of the cavities are electrically connected to corresponding contacts of the pins of the detection device, and the contacts of the cavities are also electrically connected to corresponding contacts of the protruding pins on the top of the block. Each of pairs of contacts for each cavity, and therefore for each pair of contacts for the protruding pins, have a resistor electrically between them. In the embodiment shown in FIG. 8, each resistor is 100 Ohms.

Considering operation of the detection device with just the block 815 present, measurement of, for example voltages, between pairs of contacts of each of pins 813a-c, each of the pairs of contacts for each pin would indicate presence of a 100 Ohm resistance between the pins. A game console receiving such information from the detection device, would therefore be able to ascertain that the three adjacent pins of the detection device are each associated with a 100 Ohm resistance, and may utilize that information to determine a type of block or blocks over those pins. For example, in some embodiments a 100 Ohm resistance may only be associated with a 3×1 block (e.g. having 3 cavities arranged linearly). Also for example, in some embodiments a 100 Ohm resistance may instead or in addition be associated with a particular structure of a particular material in a virtual world of gameplay, for example a particularly dimensioned wall or part of a wall made of a particular stone.

In FIG. 8, however, additional blocks are present, with a 3×1 block 817 positioned on top of block 815, a 1×1 block 819 positioned on top of block 817, and a 1×1 block 821 positioned on top of block 819.

Block 817 includes three cavities in its bottom, with the cavities receiving corresponding protruding pins of block 815. As illustrated in FIG. 8, block 817 includes only a single protruding pin on its top, otherwise block 817 is the same as block 815. For block 817, positive and negative contacts of the single protruding pin are each electrically connected to corresponding positive and negative contacts of a middle cavity of the three cavities, and each of the cavities have a 100 Ohm resistor between their positive and negative contacts. Each of the 100 Ohm resistors of block 817 are therefore electrically connected in parallel with corresponding 100 Ohm resistors of block 815. As the resistors are in parallel, measurement of voltage between contacts of each of pins 813a-c of the detection device, in the absence of blocks 819 and 821, would therefore indicate an effective lower net resistance of the resistive network formed by the parallel resistors, and the game console may use such information to determine that a block with the resistive characteristics of block 817 has been placed on top of block 815, and to modify a structure in the virtual world of game play accordingly.

Block 819, positioned on the single protruding pin of block 817, is a 1×1 block having a single cavity in its bottom to receive a single protruding pin and a single protruding pin on its top. The single cavity has a pair of electrical contacts, for convenience termed a positive contact and a negative contact, as does its single protruding pin. As with blocks 815 and 817, the positive contacts are electrically connected, as are the negative contacts. For block 819, however, a 10 Ohm resistor is coupled between the positive and negative contacts.

The 10 Ohm resistor of block 819 is therefore coupled in parallel to the resistive network formed by the 100 Ohm resistors of block 815 and 817 coupled in parallel between the positive and negative contacts of pin 813b of the detection device. Measurement of voltage between positive and negative contacts of pin 813c, in the absence of block 821, would therefore indicate two 100 Ohm resistors and a 10 Ohm resistor all connected in parallel, and the game console may use such information to determine that a block with the characteristics of block 819 has been placed on top of the combination of blocks 815 and 817, and modify the virtual world of gameplay accordingly.

Block 821 is positioned on the single protruding pin of block 819. Block 821, like block 819 is a 1×1 block having a single cavity in its bottom to receive a single protruding pin and a single protruding pin on its top. The single cavity has a pair of electrical contacts, for convenience termed a positive contact and a negative contact, as does its single protruding pin. As with block 819, the positive contacts are electrically connected, as are the negative contacts, with a 10 Ohm resistor coupled between the positive and negative contacts. The 10 Ohm resistor of block 821 is therefore connected in parallel with the parallel resistive network formed by the resistors of blocks 815, 817, and 819 coupled in parallel to the positive and negative contacts of pin 813b of the detection device. Measurement of voltage between positive and negative contacts of pin 813c would therefore indicate two 100 Ohm resistors and two 10 Ohm resistors all connected in parallel, and the game console may use such information to determine that a block with the characteristics of block 821 has been placed on top of the combination of blocks 815, 817, and 819 and modify the virtual world of gameplay accordingly.

Although the invention has been discussed with respect to various embodiments, it should be recognized that the invention comprises the novel and non-obvious claims supported by this disclosure.

What is claimed is:

1. A videogame system, comprising:
   a game console including at least one processor;
   a game controller coupled to the game console, the game controller including a plurality of user input devices;
   a detection device including a plurality of detection device electrical contacts and circuitry to determine, for the plurality of detection device electrical contacts, indications of resistances coupled across pairs of the detection device electrical contacts, and interface circuitry to provide information of the indications of the resistances coupled across pairs of the detection device electrical contacts to the game console;
   the processor being programmed by program instructions to:
      identify structures and their relative positions for placement in a virtual world of videogame play based on the indications of resistances, including identification of structures based on indications of resistances across multiple pairs of the detection device electrical contacts,
      place the identified structures in their relative positions in the virtual world, and
      process inputs from the user input devices of the game controller to determine character actions of a game player controllable game character in the virtual world of videogame play.

2. The system of claim 1, further comprising at least one physical object having a plurality of physical object electrical contacts, with at least one resistance coupled at least across a pair of physical object electrical contacts of the plurality of physical device electrical contacts.

3. The system of claim 2, wherein the detection device comprises a surface with pins extending from the surface, with the detection device electrical contacts on the pins.

4. The system of claim 3, wherein the physical object includes cavities dimensioned to receive pins of the detection device, with at least some of the physical object electrical contacts being within the cavities.

5. The system of claim 4, wherein the physical object includes protruding pins from a surface of the physical object opposite a surface of the physical object including the cavities.

6. The system of claim 5, wherein the protruding pins have pairs of physical device electrical contacts, and wherein each of the contacts of the protruding pins is electrically coupled to a corresponding contact in the cavities of the physical object.

7. The system of claim 1, further comprising a further detection device including a radio frequency identification (RFID) reader and circuitry configured to provide information read by the RFID reader to the game console, and wherein the processor is further programmed by program instructions to present the game player controllable game character in the virtual world based on the information read by the RFID reader.

8. The system of claim 7, wherein the detection device includes a flat surface with a plurality of pins extending from the surface, with the detection device electrical contacts on the pins.

9. The system of claim 8, wherein each pin includes a corresponding pair of the detection device electrical contacts.

10. The system of claim 9, wherein each pin includes a first electrical contact of the corresponding pair of the detection device electrical contacts on a first side of the pin and a second electrical contact of the corresponding pair of the electrical device electrical contacts on a second side of the pin.

11. The system of claim 10, wherein the first side and the second side are opposing sides of the pin.

12. The system of claim 8, wherein the pins are arranged on the surface in rows and columns.

13. The system of claim 7, wherein the processor is programmed by program instructions to place the identified structures in a particular area of the virtual world.

14. The system of claim 13, wherein the particular area of the virtual world comprises a base in the virtual game world for the game player controllable game character.

* * * * *